P. M. CRAIN AND J. P. SMITH.
TIRE PROTECTOR.
APPLICATION FILED MAR. 1, 1922.
1,415,803.
Patented May 9, 1922.
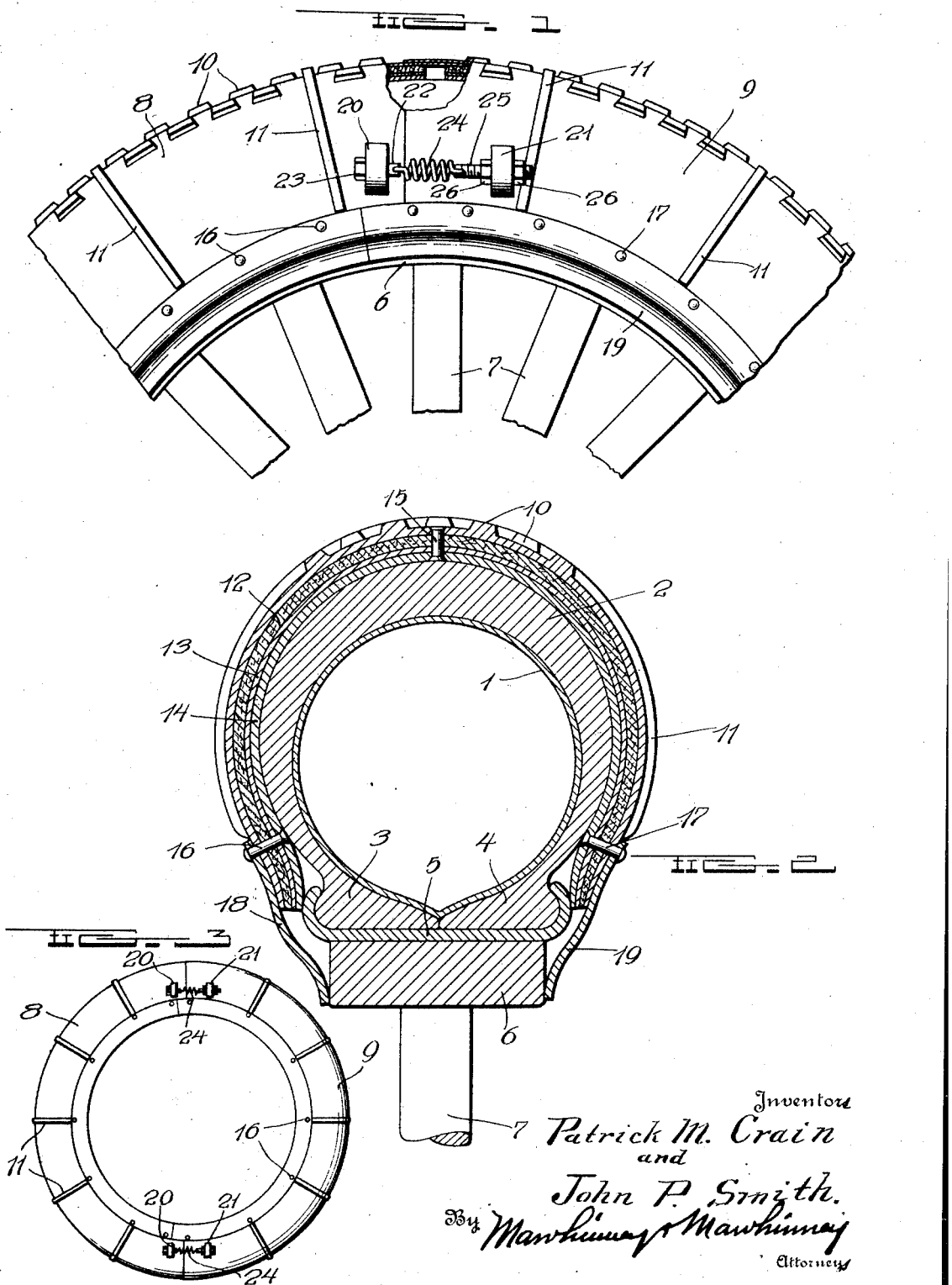

UNITED STATES PATENT OFFICE.

PATRICK M. CRAIN AND JOHN P. SMITH, OF HAMMOND, INDIANA.

TIRE PROTECTOR.

1,415,803.  Specification of Letters Patent.  Patented May 9, 1922.

Application filed March 1, 1922. Serial No. 540,264.

*To all whom it may concern:*

Be it known that PATRICK M. CRAIN and JOHN P. SMITH, citizens of the United States, residing at Hammond, in the county of Lake and State of Indiana, have invented certain new and useful Improvements in Tire Protectors, of which the following is a specification.

The present invention relates to improvements in tire protectors and aims to provide an external sheath or armor of a light construction adapted to avoid the penetration by objects usually encountered on roadways and being of a character to admit of quick and convenient assembly upon the tire.

An object of the invention is to provide an improved tire protector in which a cushion lining will be carried within the protecting sheath to come directly into contact with the vehicle tire to avoid any possible destruction apt to occur where the sheath is in direct contact with the tire and to further avoid the transmission of heat to the rubber of the tire which is apt to devitalize the rubber and lessen the life of the tire.

Other objects of the invention are to provide a sectional protector extending about both the tread and side portions of the tire with a cushioning and non-absorbent heat lining interposed between the protecting sheath and tire with flaps extending between the side portions of the protector and the wheel upon which the tire is carried to avoid the entrance of dust or other foreign matter which might get between the lining and the tire and result in the abrasion of the tire by the relative movement thereon of the protector; the invention also proposing improved adjustable means between the sections of the sheath to hold the same yieldingly together but to admit of a relative expanding movement, within limits, when encountering shocks and jars incident to travel.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a fragmentary side view with parts broken away of an improved protector constructed according to the present invention;

Fig. 2 is a cross section therethrough; and,

Fig. 3 is a side view on a reduced scale of the entire protector.

Referring more particularly to the drawings, 1 designates the usual inner tube carried within the casing or shoe 2, the latter having beads 3 and 4 which fit in the usual manner within the flanges of the rim 5 which seats upon the felly 6 of the vehicle wheel, the spokes of which are partially represented and indicated at 7.

In accordance with the invention, a protector for the casing or shoe 2 is provided comprising two semi-circular sections 8 and 9 preferably of metal, such for instance as sheet aluminum. These sections are made to extend about the tread and sides of the tire and preferably overlap slightly the flanges of the rim 5 as illustrated in Fig. 2. Anti-skid studs 10 are with advantage provided upon the tread of the protecting sheet composed of the semi-circular sections 8 and 9, and it is also preferred that the sections be strengthened against transverse strains by the radially extending ribs 11 which lie upon the outside surface of the sections from the tread portion to a point near the edges of the sheath, it being understood that these ribs may be formed in one piece with the sheath or riveted or otherwise attached thereto. The anti-skid studs or members 10 may likewise be integral with the sheath or attached thereto.

To avoid possible cutting of the tire, and to avoid the destructive friction that metal will have upon rubber, a cushioning and heat absorbent lining is interposed between the sheath and casing 2, which lining is preferably composed of three layers, one layer 12 of felt approximately an inch in depth lying against the inner surface of the sheath, an intermediate layer 13 of asbestos or some other heat absorbent material which may be a relatively thin layer, and lastly an inner layer 14 of fabric, such for instance as canvas which is more or less inextensible and has a closely woven texture adapted to prevent the asbestos from directly coming in contact with the tire which would abrade it by the relative movement between the lining and the shoe 2 and would rapidly wear it through and cause its disintegration and crumbling.

The lining thus composed of the three layers above mentioned is secured as by the counter-sunk rivets 15 at the central part of the tread portion and by the rivets 16 and 17 at the sides of the protecting sheath. The side rivets 16 and 17 are preferably in radial alignment with the tread rivets 15. The inner rivets 16 and 17 for instance being approximately three inches apart while the outer or tread rivets 15 are substantially four inches apart measuring in a circumferential direction. The placing of the rivets in this manner will virtually form a continuous fastening for the lining to the protector yet will allow slight spaces which pass transversely from one side of the protector to the other between the various rivets for allowing of local creeping of the protector to compensate for inequalities in the lining or outer surface of the tire and for distortion of the tire due to the weight imposed thereon during travel of the vehicle. Moreover, the spaces between the tread rivets and the side rivets leave the lining layers unsupported throughout arcuate distances permitting of the lining adjusting itself locally to the character and form of the side portions of the casing or shoe 2.

The inner rivets 16 and 17 are also made to serve as fastening means for rubber or other flaps 18 and 19 extending inwardly of the side portions of the protector and having their free ends shaped to lie against the sides of the felly 6 so as to prevent the entrance of dust or other foreign material between the lining and shoe. These flaps preferably extend practically all the way around the wheel. The sections of the protector are held together for instance by the use of lugs 20 and 21 which extend outwardly beyond the side portions of the ends of the metallic sheath at the meeting and overlapped edges of the sections as illustrated in Fig. 1. The lug 20 receives a bolt 22 having a head 23 adapted to hold it in the lug and to avoid its being pulled through by the coil spring 24 that serves to hold the two sections yieldingly together. A second threaded bolt 25 spaced from the first bolt is passed through the companion lug 21 and is attached to the other end of the spring 24. Lock nuts 26 are threaded upon the bolt 25 at opposite sides of the lug 21 whereby to effect an adjustment axially of the bolt 25 in order to increase or reduce the tension of the spring 24.

In the use of the device, the protector being built up as described and assembled upon the tire by placing the two semi-circular sections upon it in opposite directions and subsequently coupling the bolts and springs together in the lugs, the metallic protecting sheath will roll along in contact with the roadway or ground on which the vehicle is travelling and substantially no loss of motion will occur between the shoe 2 and the protector due to the fact that the lining is substantially thick and yielding and admits of a tight compression of the protector as a whole upon the tire 2, the tight embrace being secured by the springs 24 being relatively strong and put under high tension by the adjustable bolts 25. The springs occur at both sides of the two joints between the two sections and although they draw the sections tightly upon the tire, nevertheless they yield upon entering depressions or riding over elevated portions of the road way.

The metal sheath will turn nails or other sharp obstacles and will not allow their penetration to the tire and inner tube so that deflation due to puncture will be substantially eliminated. At the same time, the aluminum is relatively light as is also the lining so that no material weight will be added to the tire nor will a greater undesirable diameter be given the wheel. The relatively thin metal is however strongly reinforced by the ribs 11 which will enable it to withstand shocks and jars of travel.

It will be appreciated from the foregoing that we have provided a simple and inexpensive protector or armor for pneumatic tires of automobiles and like vehicles in which the device is entirely independent of the wheel and tire and may be sold as a separate accessory and placed upon the wheel with little difficulty. Furthermore, it will be understood that the device will cling to the tire so as to form substantially apart thereof with little relative movement therebetween either circumferentially or laterally and that the device will rather preserve the shoe and tire generally than cause its disintegration.

It is obvious that various changes and modifications may be made in the details of construction and design of the above specifically described embodiment of this invention without departing from the spirit thereof, such changes and modifications being restricted only by the scope of the following claims:

What is claimed is:

1. A tire protector comprising an outer sectional sheath, a relatively deep layer of felt within the sheath, a layer of asbestos lying beneath the felt, a layer of fabric within the asbestos, means for securing the several layers to the tread and side portions of the sheath, and yieldable means for holding the sections of the sheath together.

2. A tire protector comprising an outer sectional sheath of aluminum having antiskid studs on its tread part and external ribs on the outer side portions thereof, a relative deep layer of felt within the sheath, a layer of asbestos lying beneath the felt, a layer of fabric within the asbestos, means for securing the several layers to the tread and side portions of the sheath, and yieldable means for holding the sections of the sheath together.

In testimony whereof we hereunto affix our signatures.

PATRICK M. CRAIN.
JOHN P. SMITH.